A. WOODWARD.
SELF REGISTERING MEASURE.
APPLICATION FILED APR. 7, 1911.
1,020,171.
Patented Mar. 12, 1912.
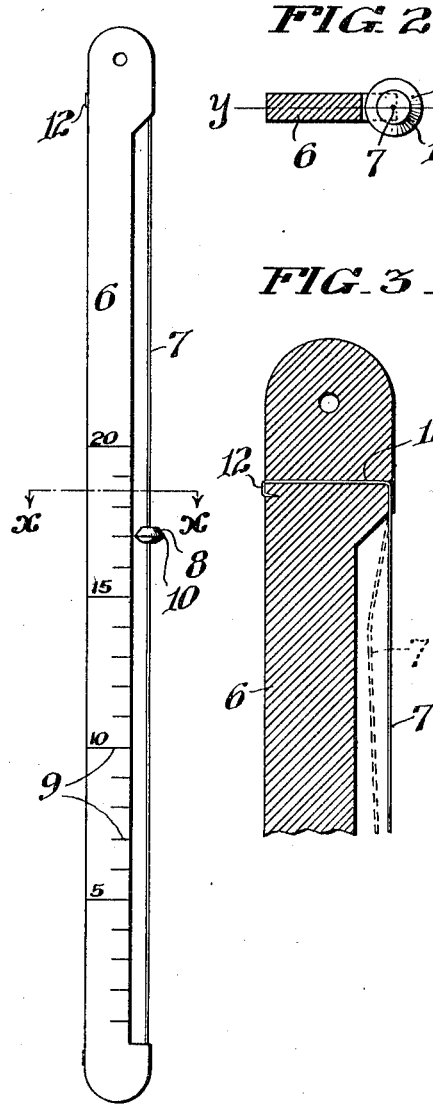
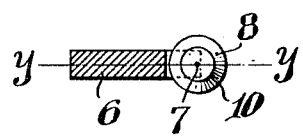
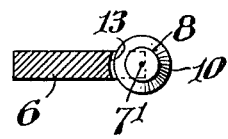
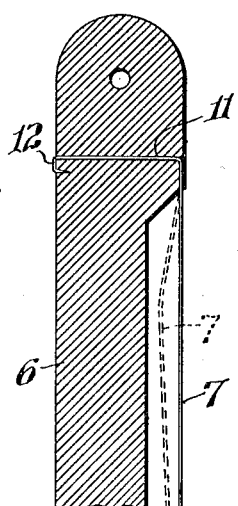
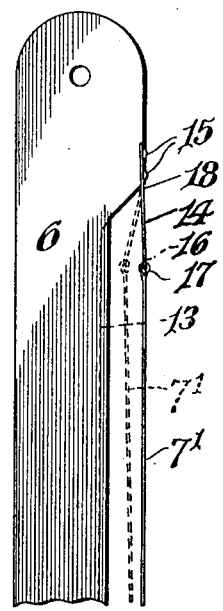

UNITED STATES PATENT OFFICE.

ABNER WOODWARD, OF NEAR MARSHALLTON, DELAWARE.

SELF-REGISTERING MEASURE.

1,020,171.  Specification of Letters Patent.  Patented Mar. 12, 1912.

Application filed April 7, 1911.  Serial No. 619,492.

*To all whom it may concern:*

Be it known that I, ABNER WOODWARD, a citizen of the United States, residing near Marshallton, Delaware, have invented a certain new and useful Self-Registering Measure, of which the following is a specification.

The purpose of my invention is to simplify and cheapen the construction of measures for fluids which are inserted within the fluid to be measured.

A further purpose of my invention is to facilitate single-hand operation of such measures.

A further purpose of my invention is to reduce the number of parts, particularly the movable parts, and to expose all of them so that they may be readily cleaned.

Further purposes of my invention appear in the specification and claims hereof.

I have preferred to illustrate my invention by that form thereof which has proved simplest, most practical and, withal, most satisfactory in actual use, while recognizing that other forms and embodiments thereof might also be used without departing from the spirit and scope of my invention.

Figure 1 is a side elevation of the preferred form of my invention. Fig. 2 is a transverse section upon line $x$—$x$ of Fig. 1. Fig. 3 is a broken longitudinal section of the upper part of the form shown in Figs. 1 and 2, taken in a position corresponding to line $y$—$y$ of Fig. 2, but above the plane of that figure. Fig. 4 is a transverse section of a modification, corresponding in position to Fig. 2. Fig. 5 is a broken side elevation of a modified form of terminal for use with my invention.

Similar numerals of reference indicate like parts in the drawings.

My invention finds its greatest usefulness with cans or other containers, such as milk cans, where a uniform size of can is used for a large number of containers.

I provide any suitable support 6 with an offset flexible guide, such as 7, a float, such as 8, and a scale in proximity to the float and which I have preferred to mount upon the support and upon one or more of the sides thereof, as at 9. The support is preferably made generally flat, with a scale upon each of the flat sides thereof, and most desirably calibrated to read directly in gallons or other measures of volume corresponding to the various depths indicated by the markings on each scale used. Obviously, different scales may be indicated on the same device, calibrated to different sizes of can or container.

I have particularly aimed to avoid the use of movable connections between the terminals of my float guide and casings about the float, because of the complication and expense of these and the difficulty in cleansing them. I have illustrated my float 8 as marked about its circumference at 10 to indicate its plane of flotation, effecting the marking by a change in diameter at this point. The float is free to turn and this insures proximity of the marking to the scale or scales.

I prefer to use a wire of steel or other suitable material for my guide 7, and to fasten it rigidly at the ends in any suitable manner, of which I have illustrated one form in Fig. 3, leaving as little slack as permissible so that the wire may be pinched over toward the support to operatively grip the float against the support. When desirable to avoid action by the fluid measured upon the guide, this may be nickeled or otherwise coated.

In Fig. 3, I have shown my guide 7 as passed through the support at 11 and fastened into the back of the support at 12.

In Fig. 4, I have shown the support concaved at 13 upon that face adjoining the guide to approximate the contour of the float, giving greater area of contact therebetween and bringing the float closer to the markings upon the scale.

In Fig. 5, I have shown a modified form of upper terminal which gives normal tension to the guide 7' with spacing from the support and permits inward movement to set the float without increase of guide tension. Here the strip 14, preferably of spring material, is secured to the support in any suitable manner at 15 and is outwardly sloped so that its end 16, which engages a loop 17 in the guide 7', is farther from the line of the wall 13 than is its point of engagement 18 with the support. The slack of the guide is thus taken up by the strap and inward movement to approximately the dotted position takes place before equal tension is again reached. By this construction I provide, as it were, an artificial terminal at 17 toward which the guide is stretched. The edge of the support may be made parallel with the guide in this position, as shown in the figure if desired, and a considerable range of inward movement of the guide is provided for.

In operation I place a properly calibrated measure embodying my invention upright in the can or other container whose content is to be measured. The float immediately rests at its proper flotation depth in the fluid. I then pinch the guide or strip, near the upper end of the device, toward the support until the float is gripped between the guide within it and the edge of the support. I then remove the device from the container, while maintaining the inward pressure upon the guide, and note the scale reading corresponding to the position of the float.

It will be noted that my device may be operated by thumb or finger pressure, has but two movable parts, one sliding and the other flexed, and is fully accessible for cleansing of the parts.

Having thus described my invention, what I claim as new and desire to secure by Letters Patent is:—

1. In a device for showing the depth of liquid in a container and measuring its contents, a support separate from the liquid container and carrying scale markings, a flexible guide mounted on the support and parallel therewith and a float movable along the guide and adapted to be gripped against the support by flexure of the guide.

2. In a device for showing the depth of liquid in a container and measuring its contents, a scale support separate from the liquid container, a guide mounted upon the support, parallel therewith and in proximity thereto, and exposed so that it may be flexed by the hand of the operator, the support being provided with scale markings, and a float upon the guide adapted to be sprung against the support by lateral movement of the guide.

3. In a device for showing the depth of liquid in a container and measuring its contents, said device having scale markings separate from the container, a support separate from the liquid container, a laterally movable guide in proximity to the support, so that it may be flexed by the hand of the operator, and a float upon the guide.

4. In a device for showing the depth of liquid in a container and measuring its contents, said device having scale markings separate from the container, a support separate from the liquid container, a guide parallel with the support, the terminals of the guide being fixed against rotation, and a float movable upon the guide and adapted to be pressed into operative relation with scale markings by lateral movement of the guide.

5. In a device for showing the depth of liquid in a container and measuring its contents, a scale support separate from the liquid container, and a guide, parallel to each other and one of which members is flexible and in operative relation to the scale markings, in combination with a float upon the guide adapted to make contact with the support by reason of the flexing of the flexible member.

6. In a device for showing the depth of liquid in a container and measuring its contents, a scale support separate from the liquid container and an exposed guide in operative relation to the scale markings, one of the members being laterally movable, and a float upon the guide adapted to be retained in position by lateral movement of the laterally movable member.

ABNER WOODWARD.

Witnesses:
HELEN I. KAUFFMAN,
WILLIAM STEELL JACKSON.

---

Copies of this patent may be obtained for five cents each, by addressing the "Commissioner of Patents, Washington, D. C."